United States Patent [19]
Lamm

[11] 3,710,575
[45] Jan. 16, 1973

[54] ROTARY PISTON INTERNAL COMBUSTION ENGINE ESPECIALLY OF TROCHOIDAL CONSTRUCTION

[75] Inventor: Heinz Lamm, Esslingen-St. Bernhardt, Germany

[73] Assignee: Daimler-Benz Aktiengesellschaft, Stuttgart-Unterturkheim, Germany

[22] Filed: Sept. 10, 1970

[21] Appl. No.: 70,990

[30] Foreign Application Priority Data

Sept. 12, 1969 Germany...................P 19 46 218.1

[52] U.S. Cl...................60/298, 23/277 C, 60/307, 60/901
[51] Int. Cl. ...........................F01n 3/10, F02b 75/10
[58] Field of Search ....60/30 R, 29 A, 298, 304, 305, 60/307, 901; 23/277 C

[56] References Cited

UNITED STATES PATENTS

| | | | |
|---|---|---|---|
| 1,709,332 | 4/1929 | Webb | 60/30 R |
| 1,848,990 | 3/1932 | Boyd | 60/30 R |
| 3,285,709 | 11/1966 | Eannarino | 60/30 R |
| 3,398,524 | 8/1968 | Leising | 60/29 A |
| 3,438,198 | 4/1969 | Bentele | 60/30 R |
| 3,444,687 | 5/1969 | Andersson | 60/30 R |
| 3,468,124 | 9/1969 | Hraboweckyj | 60/30 R |
| 3,486,326 | 12/1969 | Hermes | 60/30 R |

Primary Examiner—Douglas Hart
Attorney—Craig and Antonelli

[57] ABSTRACT

A rotary piston internal combustion engine, especially of trochoidal construction, which includes an outlet channel starting from an expansion space of the engine and an exhaust pipe for the exhaust gases which is of double-walled construction either over its entire length or over a part of its length; the annular space in the double-walled exhaust pipe is provided with a feed for either air or a fuel-air mixture at its end opposite the outlet channel and is in communication by way of one or several lines with the outlet channel or with the expansion space in proximity to the outlet channel or with the interior space of the exhaust pipe; the interior space of the exhaust pipe is provided with guide plates producing a turbulence of the mixture flowing through same.

25 Claims, 1 Drawing Figure

PATENTED JAN 16 1973　　　　　　　　　　　　　3,710,575
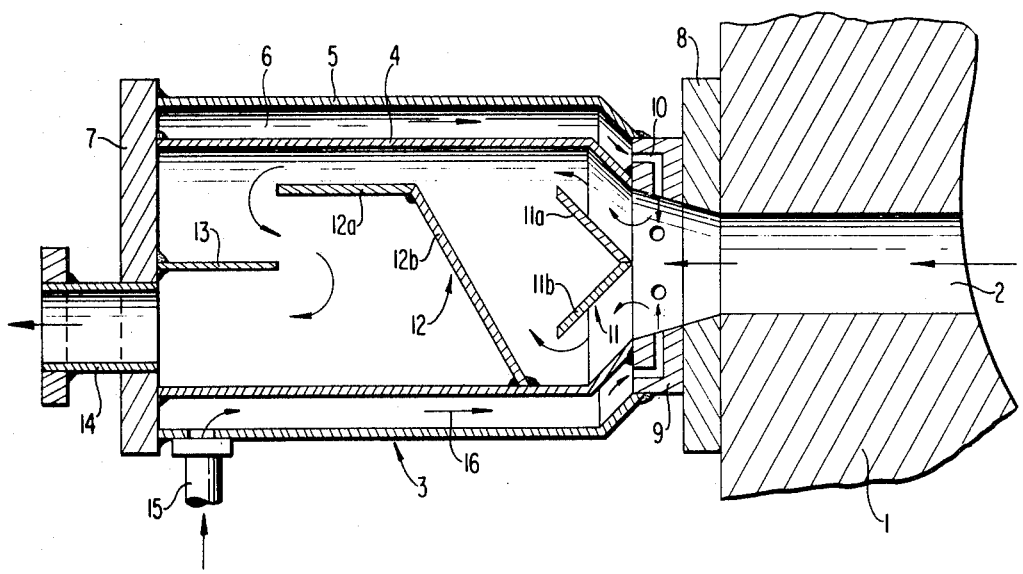
INVENTOR:
HEINZ LAMM
BY Craig, Antonelli, Stewart & Hill
ATTORNEYS

ROTARY PISTON INTERNAL COMBUSTION ENGINE ESPECIALLY OF TROCHOIDAL CONSTRUCTION

The present invention relates to a rotary piston internal combustion engine, especially of trochoidal construction, with an exhaust channel starting from an expansion space and an adjoining exhaust pipe for the exhaust gases of double-walled construction either over its entire length or over a part of its length, whose annular space is provided at the end opposite the exhaust channel with a supply for air or for a fuel-air mixture and is in communication by way of one or several lines with the exhaust channel or in proximity thereof with the expansion space or with the interior space of the exhaust pipe, as described in the copending application Ser. No. 867,791, assigned to the assignee of the present application.

As already described in the aforementioned copending application, certain requirements are made in internal combustion engines of the exhaust gases thereof as regards the proportion of uncombusted harmful components.

In order to enable an afterburning of the exhaust gases in rotary piston internal combustion engines, also with an operation of the internal combustion engine during idling or at smaller partial loads, where the uncombusted materials in the exhaust gas are relatively large, after-burning-air which flows counter current to the exhaust gases along the hot inner walls of the exhaust pipe, is thereby heated and thus does not permit the exhaust gas mixture temperature to drop too strongly.

Since the exhaust gases in rotary piston internal combustion engines possess a very slight turbulence and a good mixing of the exhaust gases with the supplied air is therefore made difficult, the present invention is concerned with the task to provide an installation which enables a more intensive afterburning.

The underlying problems are solved according to the present invention in that the interior space of the exhaust pipe is provided with guide baffles or guide plates producing a turbulence.

In the installation according to the present invention the reaction with the hot exhaust gas then takes place by reason of the hot guide baffles and by the deflection and turbulence in the interior space of the exhaust pipe constructed as reactor.

In an advantageous embodiment of the present invention the diameter of the cylindrical inner wall of the exhaust pipe may be larger than the diameter of the exhaust or outlet channel, and the transistion from the outlet channel to the interior space of the exhaust pipe may be constructed conically.

Accordingly, it is an object of the present invention to provide a rotary piston internal combustion engine, particularly of trochoidal construction, which avoids by simple means the aforementioned shortcomings and drawbacks.

Another object of the present invention resides in a rotary piston internal combustion engine of trochoidal construction which enhances the afterburning of the exhaust gases within the exhaust pipe.

A further object of the present invention resides in a rotary piston internal combustion engine in which an effective afterburning of the exhaust gases is made possible by increased turbulence in the afterburner section of the exhaust pipe.

A still further object of the present invention resides in an exhaust pipe for rotary piston internal combustion engines which assures adequate turbulence of the exhaust gases yet permits the use of relatively inexpensive materials in its construction.

These and further objects, features and advantages of the present invention will become more obvious from the following description when taken in connection with the accompanying drawing which shows, for purposes of illustration only, one embodiment in accordance with the present invention, and wherein The single FIGURE is a somewhat schematic partial cross-sectional view through a rotary piston internal combustion engine provided with an exhaust pipe in accordance with the present invention.

Referring now to the single FIGURE of the drawing, reference numeral 1 designates the casing of a conventional rotary piston internal combustion engine in which is arranged an exhaust or outlet channel 2 that terminates in an exhaust pipe generally designated by reference numeral 3 of double-walled construction. The exhaust pipe 3 consists of a cylindrical inner wall 4 and of an outer wall 5 arranged coaxially thereto. A free annular space 6 is left between the two walls 4 and 5. Its end faces are welded, respectively, to a flange 7 and to a collar 9 secured at the flange 8 which is provided with several lines 10 distributed over the circumference thereof and constructed as bores. The transistion from the outlet channel 2 by way of the flange 8 and collar 9 to the cylindrical inner wall 4 is constructed conically.

A first guide baffle or plate generally designated by reference numeral 11 is arranged within this area shortly downstream of the lines 10 in the interior space of the exhaust pipe 3, whose two webs 11a and 11b are connected with each other at an acute angle. A second guide baffle generally designated by reference numeral 12 and secured in the center of the exhaust pipe 3, also consists of two webs 12a and 12b which are connected with each other under an obtuse angle. A third guide baffle or guide plate 13 is disposed parallel to the web 12a is welded to the flange 7 which is provided with the connecting pipe 14 for an exhaust of conventional construction (not shown).

The air necessary for the afterburning is conducted into the annular space 6 by way of a line 15 and flows from there in the direction of arrow 16 along the hot inner wall 4 of the exhaust pipe 3 into the lines 10. The heated air discharges into the interior space of the exhaust pipe 3 and mixes within the same with the hot exhaust gases flowing out of the outlet channel 2 at a high velocity which impinge against the hot webs 11a and 11b whereby the as yet uncombusted components in the exhaust gas combust or burn. The mixture of exhaust gas-air is deflected at the first guide baffle or plate 11 by web 11a and 11b and flows along the second guide baffle or plate 12. As a result of the third guide baffle or plate 13 arranged at the flange 7, the through-flowing mixture is conducted into the exhaust structure (not shown) by way of the connecting pipe 14 after a double change in direction. As a result of this increased path which the mixture of exhaust gas-air has to traverse in the interior space of the exhaust pipe 3, the mixture is conducted into the exhaust with a lower temperature so that relatively inexpensive materials may be utilized for the exhaust structure. For reasons of a further temperature increase of the exhaust gases a lean gas mixture (fuel-air mixture with $\lambda \geqq 1$), may be used as admixture to the heated up afterburner-air.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What I claim is:

1. A rotary piston internal combustion engine with an exhaust system including outlet channel means starting from an expansion space of the engine and exhaust pipe means for the exhaust gases adjoining said outlet channel means and of double-walled construction at least over a part of its length to form an annular space provided with a feed for air or fuel-air mixture, the interior space of the exhaust pipe means being provided with guide means for producing a turbulence, said guide means including first guide plate means provided in said exhaust pipe means near the end thereof adjacent the outlet channel means having web portions subtending an angle and so arranged that the exhaust gases from the outlet channel means impinge thereagainst at least in part and further guide plate means arranged downstream of said first guide plate means, said further plate means including second guide plate means having two web portions disposed at an angle to one another and third guide plate means disposed near the downstream end of said exhaust pipe means at least approximately parallel to one of the two web portions of said second guide plate means, said third guide plate means including portions arranged downstream of the most downstream end of said second guide plate means, said guide plate means being arranged for effectively producing a double deflection of the gas stream flowing through said exhaust pipe means.

2. A rotary piston internal combustion engine according to claim 1, characterized in that the angle formed by the web portions of the second guide plate means is an obtuse angle.

3. A rotary piston internal combustion engine according to claim 1, characterized in that said third guide plate means is attached to an end flange on the exhaust pipe means disposed downstream of said outlet channel means.

4. A rotary piston internal combustion engine according to claim 3 characterized in that said end flange is perpendicular to the direction of flow from said outlet channel means and in that said end flange closes off a major portion of the cross-section of said exhaust pipe means.

5. A rotary piston internal combustion engine according to claim 4, characterized in that said third guide plate means is a flat plate extending from said end flange upstream to a position approximately in line with the most downstream end of said second guide plate means.

6. A rotary piston internal combustion engine according to claim 1, characterized in that both the first guide plate means and the second guide plate means have their major angular displacement between their respective web portions on the side facing the outlet channel means.

7. A rotary piston internal combustion engine according to claim 1, characterized in that said second guide plate means has one web portion attached directly at a side wall of the exhaust pipe means whereby gases can pass over said second plate means only at one side thereof.

8. A rotary piston internal combustion engine according to claim 7, characterized in that the web portion of said second guide plate means which is not fixed to the side wall extends parallel to an opposite side wall of said exhaust pipe means.

9. A rotary piston internal combustion engine according to claim 1, characterized in that the two web portions are constructed as flat plates, one web portion being attached directly at a side wall of the exhaust pipe means.

10. A rotary piston internal combustion engine according to claim 8, characterized in that said web portion which is parallel to the side wall is shorter than said other web portion.

11. A rotary piston internal combustion engine with an exhaust system including outlet channel means starting from an expansion space of the engine and exhaust pipe means for the exhaust gases adjoining said outlet channel means and of double-walled construction at least over a part of its length to form an annular space provided with a feed for air or fuel-air mixture, the interior space the exhaust gases from the outlet channel means impinge thereagainst at least in part and further guide plate means arranged downstream of said first guide plate means, said further guide plate means including second guide plate means having two web portions disposed at an angle to one another and third guide plate means disposed near the downstream end of said exhaust pipe means at least approximately parallel to one of the two web portions of said second guide plate means, said guide plate means being arranged for effectively producing a double deflection of the gas stream flowing through said exhaust pipe means, on web portion of the second guide plate means extending approximately parallel to and nearer an inner wall of the exhaust pipe means and the other web portion thereof extending across the exhaust pipe means toward the opposite side thereof, the angle formed by the web portions of the first guide plate means being an acute angle, the angle formed by the web portions of the second guide plate means being an obtuse angle, the third guide plate means being a substantially flat plate extending substantially in the axial direction of the exhaust pipe means.

12. A rotary piston internal combustion engine according to claim 11, characterized in that the diameter of the substantially cylindrical inner wall of the exhaust pipe means is larger than the diameter of the outlet channel means and in that the transition from outlet channel means to the interior space of the exhaust pipe means is constructed conically.

13. A rotary piston internal combustion engine according to claim 11, characterized in that the angle formed by the web portions of the first guide plate means is an acute angle.

14. A rotary piston internal combustion engine according to claim 13, characterized in that the angle formed by the web portions of the second guide plate means is an obtuse angle.

15. A rotary piston internal combustion engine according to claim 11, characterized in that the annular space is provided with feed means for air or fuel-air mixture near the end thereof opposite the outlet channel means and is in communication with the exhaust system by way of at least one line means.

16. A rotary piston internal combustion engine according to claim 11, characterized in that said exhaust pipe means is of double-wall construction substantially over its entire length.

17. A rotary piston internal combustion engine according to claim 11, characterized in that the engine is of trochoidal construction.

18. A rotary piston internal combustion engine with an exhaust system including outlet channel means starting from an expansion space of the engine and exhaust pipe means for the exhaust gases adjoining said outlet channel means and of double-walled construction at least over a part of its length to form an annular space provided with a feed for air or fuel-air mixture, the interior space of the exhaust pipe means being provided with guide means for producing a turbulence, said guide means including first guide plate means provided in said exhaust pipe means near the end thereof adjacent the outlet channel means having web portions subtending an angle and so arranged that the exhaust gases from the outlet channel means impinge thereagainst at least in part and further guide plate means arranged downstream of said first guide plate means, said further guide plate means including second guide plate means having two web portions disposed at an angle to one another and third guide plate means disposed near the downstream end of said exhaust pipe means at least approximately parallel to one of the two web portions of said second guide plate means, said guide plate means being arranged for effectively producing a double deflection of the gas stream flowing through said exhaust pipe means, one web portion of the second guide plate means extending approximately parallel to and nearer an inner wall of the exhaust pipe means and the other web portion thereof extending across the exhaust pipe means toward the opposite side thereof, the angle formed by the web portions of the first guide plate means being an acute angle, the angle formed by the web portions of the second guide plate means being an obtuse angle, the third guide plate means being a substantially flat plate extending substantially in the axial direction of the exhaust pipe means.

19. A rotary piston internal combustion engine according to claim 18, characterized in that the annular space is in communication with the exhaust system by way of several line means.

20. A rotary piston internal combustion engine according to claim 15, characterized in that the annular space is in communication with the outlet channel means by way of said line means.

21. A rotary piston internal combustion engine according to claim 15, characterized in that the annular space is in communication by way of said line means with the expansion space in proximity to the outlet channel means.

22. A rotary piston internal combustion engine according to claim 15, characterized in that the annular space is in communication with the interior space of the exhaust pipe means by way of said line means.

23. A rotary piston internal combustion engine with an exhaust system including outlet channel means starting from an expansion space of the engine and exhaust pipe means for the exhaust gases adjoining said outlet channel means and of double-walled construction at least over a part of its length to form an annular space provided with a feed for air or fuel-air mixture, the interior space of the exhaust pipe means being provided with guide means for producing a turbulence, said guide means including first guide plate means provided in said exhaust pipe means near the end thereof adjacent the outlet channel means having web portions subtending an angle and so arranged that the exhaust gases from the outlet channel means impinge thereagainst at least in part and further guide plate means arranged downstream of said first guide plate means, said further guide plate means including second guide plate means having two web portions disposed at an angle to one another and third guide plate means disposed near the downstream end of said exhaust pipe means at least approximately parallel to one of the two web portions of said second guide plate means, said guide plate means being arranged for effectively producing a double deflection of the gas stream flowing through said exhaust pipe means, the third guide plate means being a substantially flat plate extending substantially in the axial direction of the exhaust pipe means.

24. A rotary piston internal combustion engine according to claim 23, characterized in that the annular space is provided with feed means for air or fuel-air mixture near the end thereof opposite the outlet channel means and is in communication with the exhaust system by way of at least one line means.

25. A rotary piston internal combustion engine according to claim 24, characterized in that the engine is of trochoidal construction.

* * * * *